UNITED STATES PATENT OFFICE.

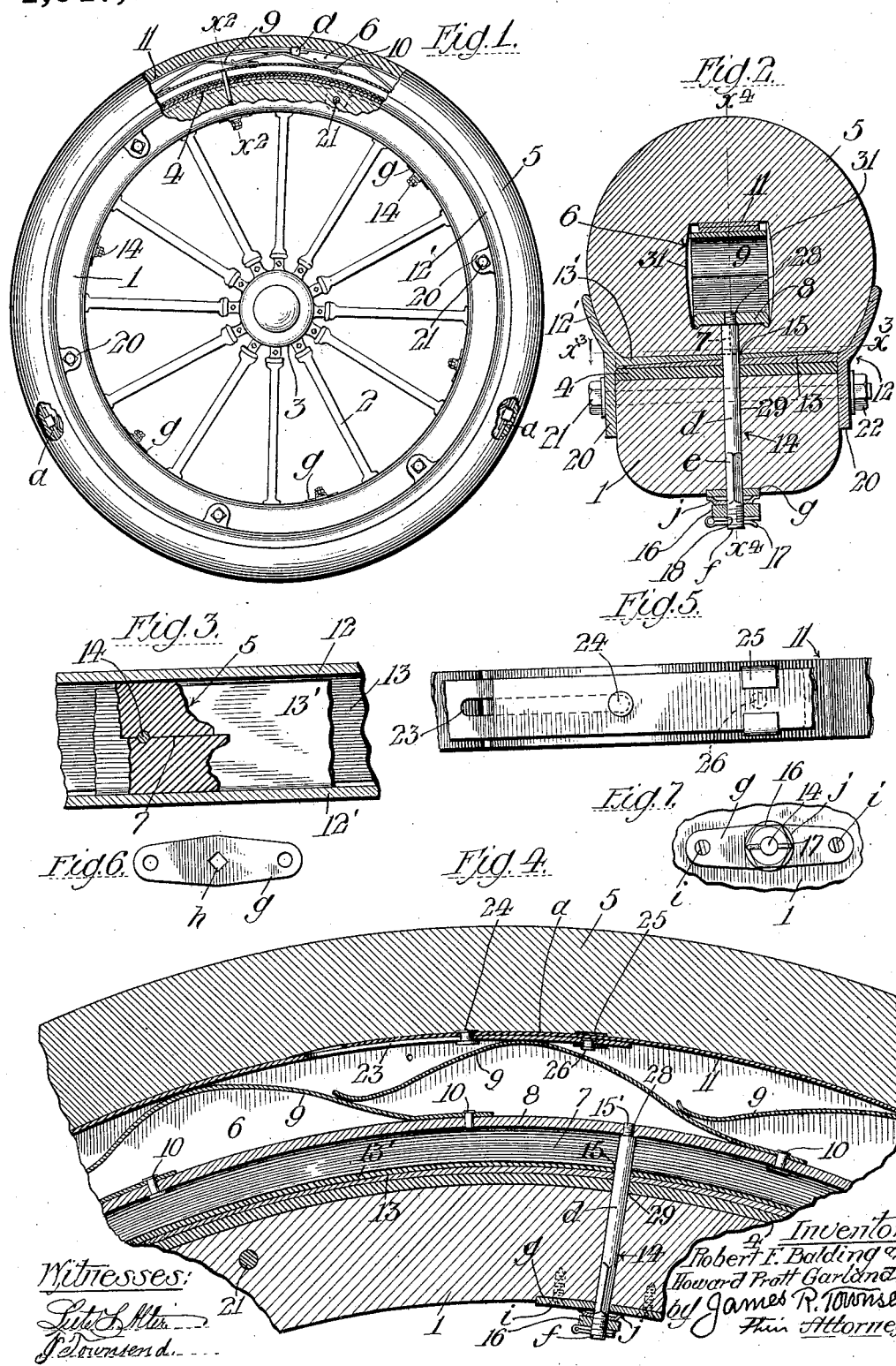

ROBERT F. BALDING AND HOWARD PRATT GARLAND, OF LOS ANGELES, CALIFORNIA.

COMBINATION SPRING-CUSHION-TIRE WHEEL.

1,047,485. Specification of Letters Patent. Patented Dec. 17, 1912.

Application filed October 20, 1906. Serial No. 339,879.

*To all whom it may concern:*

Be it known that we, ROBERT F. BALDING and HOWARD PRATT GARLAND, both citizens of the United States, residing at Los Angeles, in the county of Los Angeles and State of California, have invented a new and useful Combination Spring-Cushion-Tire Wheel, of which the following is a specification.

It is one of the objects of this invention to provide for automobiles and other vehicles a tire having a permanent resiliency equal to that of a pneumatic tire, without the inconvenience of deflation.

Heretofore, disastrous and fatal accidents have occurred through the deflation or other displacement or deformation of the tires of automobiles while the machine was running at high speed.

Another object of this invention is to provide a tire of high resiliency and great strength, and thereby to do away with the liability of such accidents.

The accompanying drawings illustrate the invention:—

Figure 1 is a side view of a wheel embodying the invention, portions being broken away to expose the inner construction. Fig. 2 is a cross-section of the rim and tire of a wheel, on line $x^2$, Fig. 1. Fig 3 is a sectional detail on line $x^3$, Fig. 2. Fig. 4 is an enlarged mid-plane section of a wheel, showing in detail the portion sectioned in Fig. 1. Fig. 5 is a detached fragmental view of one of the slip joints of the outer band within which the metal springs are inclosed. Fig. 6 is a view of the radial bolt-lock detached. Fig. 7 is a view of the radial bolt lock, nuts and bolt, in place. A fragment of the wheel-rim is shown.

1 designates the rim of an automobile wheel, which rim may be formed of fellies of wood or other material of the usual construction, the same being supported by the usual spokes 2 and hub 3.

4 is a metal band tightly fitted on the rim 1, in the nature of an ordinary metal tire.

5 is a hollow annular cushion-tire which may be made of india-rubber, or a substitute therefor, and is provided with an annular chamber or central bore 6 to accommodate resilient means formed of metal and hereinafter more particularly described.

The cushion-tire 5 may be of any suitable cross-sectional form and is slit on the inner side to form an annular opening 7 into the annular chamber or bore 6, for the purpose of inserting metallic resilient means which may comprise an annular spring-supporting band 8, springs 9 carried thereby and which may be secured thereto by rivets 10, and an outer spring-inclosing band 11 arranged within said chamber or bore and provided with one or more slip joints $a$, and adapted to yield and return responsive to the compression and expansion of the springs 9 and cushion 5, as the wheel moves over the ground.

The metal springs 9 may be of any appropriate and effective form to hold the band 11 away from the band 8. In the drawings they are illustrated as curved leaf springs, each spring being fastened at one end to the supporting band 8 and resting at the other end on resilient portion of the spring next thereto, the several portions overlapping and working on each other successively around the wheel.

12, 12′ designate annular side guards having inwardly projecting telescoping collars 13, 13′, and adapted to fit the sides of the rim 1 and cushion tire 5, and to form a joint between said rim and the cushion tire. The collar 13 of the side guard 12 is formed to tightly fit the band 4, and the collar 13′ is constructed to telescope and wedge tightly on the collar 13, so that the two guards 12, 12′ form an inclosed joint between the rim and the cushion-tire. Said collars are correspondingly perforated to receive radial bolts 14 inserted through the rim 1 through perforations 15 in the collars and screwed into the inner spring-supporting band 8. Said bolts 14 are provided at the inserted ends with reduced screw-threaded portions 15′ to screw into hole 28 in the spring supporting band 8. The body of each bolt 14 is provided with a cylindrical portion $d$ that forms a shoulder to butt against the band 8, and with an angular portion *e* and a screw threaded portion *f*. Locking straps *g* are fixed to the felly 1 and are each provided with an angular hole *h* to fit the angular portion *e* of the bolt and are held against turning by any suitable means as by being sunk in the body of the felly and held by brads or screws *i*.

*j* is a spring washer around the screw threaded end *f*. 16 is a nut screwed against said washer to draw the felly and the spring supporting bands toward each other.

17 is a cotter pin inserted through a hole 18 in the bolt to keep the nut 16.

The guards 12, 12' may be provided with ears or lugs 20 through which bolts 21 may be passed, extending through the rim 1 and secured by nuts 22 to tightly hold the guards in place. The spring-inclosing band 11 may be provided with any desired number of slip joints *a*, each being formed by means of a slot 23 in one end and a stud 24 in the other end of the band, which ends lap upon each other; a free end of one of the bands being held by a loop 25 which may be fastened by a rivet 26 to such end, and which may slide on the other of the lapped ends.

To assemble the wheel, the hub, spokes and rim may be united in any usual way, and the rim band 4 may be tightly applied to the rim of the wheel in any well-known way. The spring supporting band with springs 9, secured to said band will be inclosed by the expansible band 11, and these parts will then be inserted through the slit 7 into the chamber 6 of the cushion tire. Then the collar 13 of the guard 12 may be applied around the band 4, and the collar 13' of the guard 12' may be inserted inside the cushion-tire 5, and then be forced on to the collar 13.

By reference to Fig. 2 it will be seen that the collars 13, 13' are wedge-shaped in cross-section, the one telescoping tightly into the other. Care will be taken that the holes 28 and 29 are in registering position. Then the bolts 21 will be inserted through the ears or lugs 20 of the guards through the rim 1, and will be secured and screwed tight by the nuts 22. Then the bolts 14 may be inserted through the holes 29 and screwed into the holes 28, a wrench, not shown, being used on the part *e* for this purpose. Then the straps *g* and washers *j* will be applied, the nuts 16 screwed on to the bolts 14 and against the washers, and secured by the cotter-pins 17, whereupon the wheel is ready for use.

It is evident that the proportions of the various parts may be varied within the judgment of the constructors. We do not limit ourselves to the exact form or proportions of any of the parts. We deem it preferable to form the chamber 6 with hollow side walls, as shown at 31, to increase the resiliency, and to avoid interference between the cushion-tire and the metal springs.

The spring means between the bands 8 and 11 within the bore tend to maintain the equal normal diameter of said bore and at those points where the tire is acted upon by excessive strains, the tire yields and immediately regains its proper form after the pressure is released, the effect being practically like that of a pneumatic tire. It is to be noted, however, that the bursting strain on the cushion-tire 5 will not compare to that exerted by the air in an inflated tire, so that the tendency to destroy the rubber portion of the tire is less, inasmuch as the strains on the body of the material itself are practically equalized during the rotation of the wheel.

In practice, we prefer to mount the tire under considerable strain exerted by the spring means 9 to force the band 11 outward away from the inner band 8. In order to do this it is necessary to compress the outer band 11 and to hold it by some suitable means until after the same is inserted into the tire. Then the pressure may be applied by any suitable means to hold the cushion-tire 5 in proper form until all the parts have been fastened, as above stated. The means for holding the parts in position until after all the parts have been assembled, will be readily understood by a mechanic, and illustration of such means is not made herein as the same form no part of this invention.

What we claim is:—

1. In a combination spring cushion-tire wheel, a hollow annular cushion-tire having an annular central bore and a slit from its inner side providing a continuous opening to the central bore, said slit being closed when the parts are all in place; an annular spring-supporting band in said bore and covering said slit, and reversely-curved overlapping springs seated upon the spring-supporting band within said bore and adapted to contact their free ends centrally and slidingly, each curved upon the portion of the preceding one to hold the tire from collapsing.

2. In a combination spring cushion-tire wheel, a hollow annular cushion-tire having an annular central bore and a slit from its inner side providing a continuous opening to the central bore, said slit being closed when the parts are all in place; an annular spring-supporting band in said bore and covering said slit, springs seated upon the spring-supporting band within said bore, and an outer spring-inclosing band arranged within said bore upon said springs and provided with a slip joint.

3. In a combination spring cushion-tire wheel, a hollow annular cushion-tire having an annular central bore and a slit from its inner side providing a continuous opening to the central bore, said slit being closed when the parts are all in place; an annular spring-supporting band in said bore and covering said slit, overlapping leaf-springs upon said spring-supporting band within said bore, and an outer spring-inclosing band upon said springs.

In testimony whereof, we have hereunto set our hands at Los Angeles, California, this 12th day of October 1906.

ROBERT F. BALDING.
HOWARD PRATT GARLAND.

In presence of—
JAMES R. TOWNSEND,
JULIA TOWNSEND.

Copies of this patent may be obtained for five cents each, by addressing the "Commissioner of Patents, Washington, D. C."